Sept. 27, 1932.   J. HAW   1,879,225
PROPELLER BLADE
Filed June 5, 1930   2 Sheets-Sheet 1
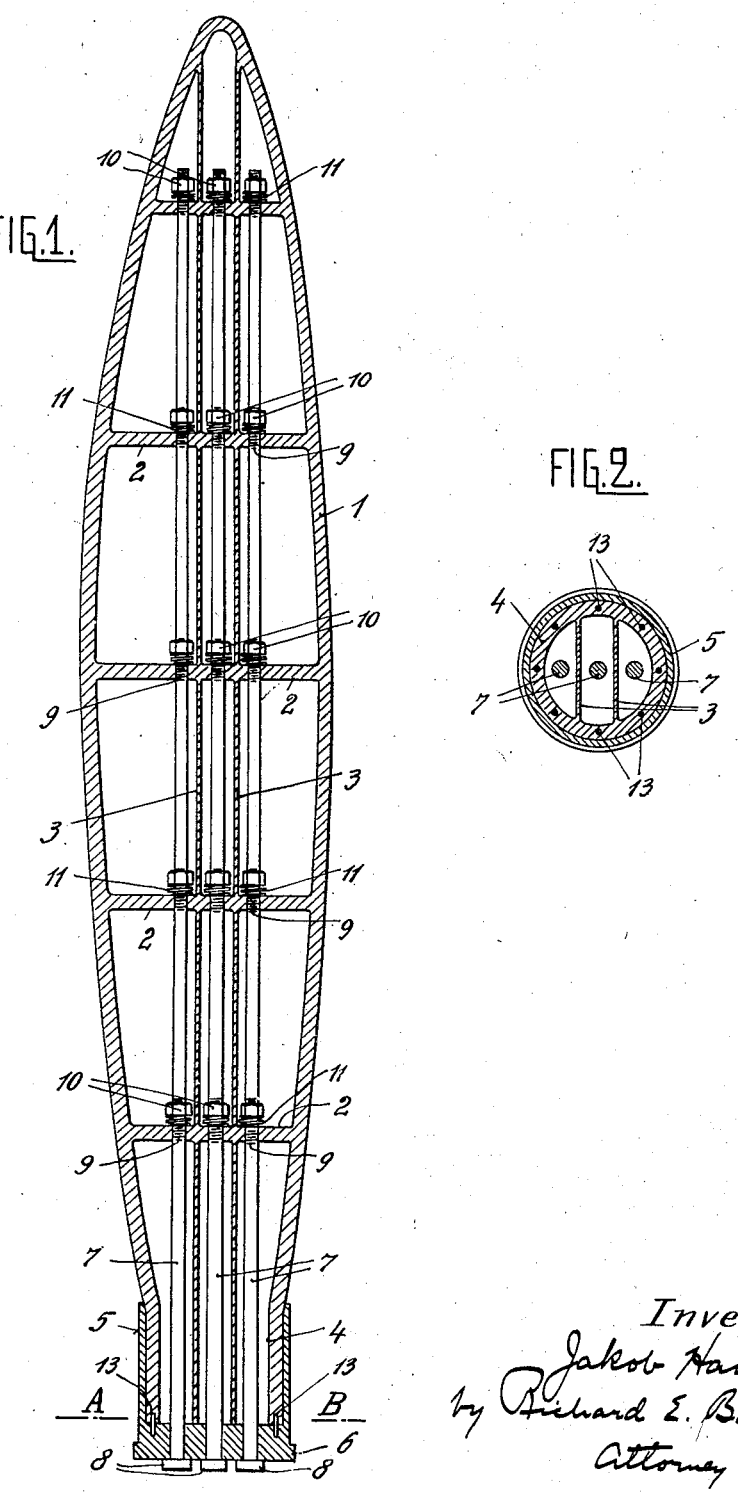
Inventor:
Jakob Haw
by Richard E. Babcock
Attorney Sept. 27, 1932.  J. HAW  1,879,225
PROPELLER BLADE
Filed June 5, 1930   2 Sheets-Sheet 2

Inventor:
Jakob Haw
by Richard E. Babcock
Attorney

Patented Sept. 27, 1932

1,879,225

UNITED STATES PATENT OFFICE

JAKOB HAW, OF BERLIN-STAAKEN, GERMANY, ASSIGNOR TO THE FIRM OF PROPELLER AKTIENGESELLSCHAFT, OF SCHAFFHAUSEN ON RHINE, SWITZERLAND

PROPELLER BLADE

Application filed June 5, 1930, Serial No. 459,373, and in Germany June 28, 1929.

The present invention relates to propeller blades which are cast as hollow elements and are provided with several transverse walls formed integral therewith and one or more steel rods arranged longitudinally in the interior of the hollow blade element.

The invention has for its purpose such a securing of the blade body to the steel rod or rods that during the motion of a propeller provided with blades of the present type the blade which may be formed of light metal is eased as much as possible from tensile stresses.

A further object of this invention is to provide compensation for differences in tension between the steel rods and the metal of the blade element due to variations in temperature.

Finally the invention has for its purpose a securing of the blade element against high compressive stresses acting on its upper surface.

In the accompany drawings:

Figure 1 is a longitudinal section through a propeller blade provided with three longitudinal rods.

Figure 2 is a cross-section on the line A—B of Figure 1 through the base of the propeller blade and a sleeve receiving the base.

Figure 3:
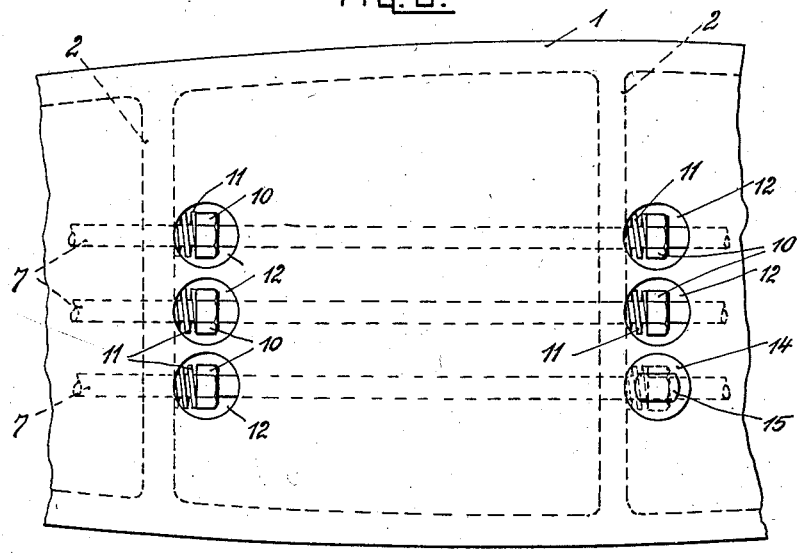
Figure 3 is an enlarged exterior view of one part of the propeller blade showing apertures provided in the blade element through which the nuts on the rods are inserted.
Figure 4:
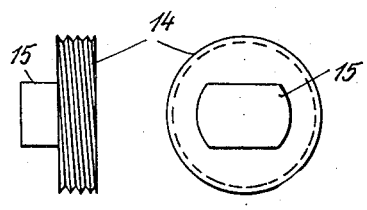

Figure 4 a plan view and side elevation of a screw stopper such as is used for closing the apertures illustrated in Figure 3.

Figure 5:

Figure 5 is a still further enlarged illustration of a spring as inserted on the longitudinal rods between the transverse wall of the blade elements and a nut.

A hollow body or blade 1 cast preferably from light metal, is strengthened against compressive stress by transverse walls 2 and longitudinal walls 3 formed integral therewith. The cylindrical base 4 of the propeller blade is displaceably disposed in the longitudinal direction in a steel sleeve 5 in the base 6 of which are secured three rods 7 preferably of steel which are provided with heads 8.

The steel rods are led through transverse walls 2 in which corresponding apertures are provided. The steel rods 7 are provided at the places where they pass through the transverse walls with threads 9 on which nuts 10 are screwed.

Between the transverse walls 2 and the nuts 10 are inserted resilient intermediate layers consisting preferably of helical springs 11. On the rear surface of the blade body 1 are provided apertures 12 in direct proximity to the transverse walls 2 so that the nuts 10 may be inserted through these openings and tightened against the transverse walls by means of a suitable key.

During the motion of a propeller provided with blades according to this invention the steel rods are stretched as a result of the tensile strains caused by centrifugal force in the blades. The nuts 10 serving for relieving the longitudinal walls 1 and 3 of load are tightened against the various transverse walls in various degrees and actually the pressure of a nut against the transverse wall is greater the nearer the transverse wall concerned lies to the tip of the blade, so that in spite of this stretching of the steel rods 7 by the sum of the said different pressures in advance imposed on the various transverse walls 2, the centrifugal force acting on the blade body is uniformly absorbed as far as possible by all the transverse walls 2.

Further, the tightness of each nut is substantially proportional to the elongation in length due to centrifugal action of the portion of the rod between the nut and the base of the blade due to strains caused by centrifugal force. This difference in tension of the nuts 10 can be adjusted without difficulty for each transverse wall, by means of the springs 11 inserted between the transverse walls 2 and the nuts 10.

This difference of tension of the steel rods 7 at the separate transverse walls 2 in conjunction with the free displaceability of the blade base 4 in the longitudinal direction of the blade in the steel sleeve 5 causes the tensile forces produced during the motion of a propeller to be sustained almost completely by the steel rods 7. The tension of the steel rods 7 is however without influence on the blade body which preferably consists of light metal and this is subject at the most to a slight longitudinal displacement in the steel sleeve surrounding its base 4 corresponding to the tension of the steel rods 7. In order to secure the light metal blade against rotation about its own longitudinal axis the base is provided with pins 13 which engage in recesses in the base 6 of the steel sleeve 5.

In securing the blade body to the steel rods 7 the nuts 10 are only tightened so much that the springs 11 retain a certain spring play so that the differences in the tension of the steel rods on the one hand and of the light metal on the other hand resulting during the variations of temperature can be easily compensated thereby.

The apertures 12 of the blade body 1 are provided with screw threads. Stoppers 14 provided with corresponding threads and having a bar shaped head 15 serve for closing the apertures. After screwing the closure stopper in the openings 12 the heads 15 are ground off flush with the upper surface of the blade.

I declare that what I claim is:—

1. A hollow cast propeller blade having transverse inner walls and at least one longitudinal threaded rod anchored at the base of the blade and tensioned against the said transverse walls, the said transverse walls being in advance subjected in a direction towards the base of the blade, to different predetermined pressures, such as will enable the said transverse walls uniformly to absorb the centrifugal force acting on the different portions of the blade body at the motion of the propeller.

2. A hollow cast propeller blade having transverse inner walls, at least one longitudinal threaded rod anchored at the base of the blade and extending through said transverse walls, nuts on said rod for tensioning the rod against said transverse walls and resilient means on said rod between each of said nuts and the corresponding transverse wall.

3. A hollow cast propeller blade having transverse inner walls, at least one longitudinal threaded rod anchored at the base of the blade and extending through said transverse walls, nuts on said rod for tensioning the rod against said transverse walls and compression springs on said rod between each of said nuts and the corresponding transverse wall.

4. A hollow cast propeller blade having inner transverse walls, a metal sleeve receiving the base of said blade, at least one longitudinal threaded rod secured in said sleeve and extending through said transverse walls, nuts on said rods for tensioning the rod against said transverse walls and resilient means between each of said nuts and the corresponding transverse wall.

5. A hollow cast propeller blade having transverse inner walls, at least one longitudinal threaded rod anchored at the base of the blade and extending through said transverse walls and nuts on said rod for tensioning the same against said transverse walls, said nuts being tightened against the transverse wall with increasing tension according to the distance from the base of the blade.

6. A hollow cast propeller blade having transverse inner walls, at least one longitudinal threaded rod anchored at the base of the blade and extending through said transverse walls, nuts on said rod for tensioning the same against said transverse walls, openings in one of its outer walls adjacent said transverse walls and adapted to allow the insertion and tightening of the said nuts and threaded stoppers for closing said openings.

In testimony whereof, I have signed my name to this specification at Berlin, Germany, this 23rd day of May, 1930.

JAKOB HAW.